US007573895B2

(12) United States Patent
King

(10) Patent No.: US 7,573,895 B2
(45) Date of Patent: Aug. 11, 2009

(54) SOFTWARE ASSISTED RDMA

(75) Inventor: Steven R. King, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 751 days.

(21) Appl. No.: 10/876,997

(22) Filed: Jun. 24, 2004

(65) Prior Publication Data

US 2005/0286513 A1    Dec. 29, 2005

(51) Int. Cl.
*H04L 12/56* (2006.01)
(52) U.S. Cl. ...................................... 370/412; 709/217
(58) Field of Classification Search ................ 370/394, 370/412, 419, 463; 709/217, 250
See application file for complete search history.

(56) References Cited

U.S. PATENT DOCUMENTS

| 6,147,996 | A | * | 11/2000 | Laor et al. ................ 370/394 |
|---|---|---|---|---|
| 7,376,755 | B2 | | 5/2008 | Pandya |
| 7,415,723 | B2 | | 8/2008 | Pandya |
| 7,487,264 | B2 | | 2/2009 | Pandya |
| 2004/0010545 | A1 | | 1/2004 | Pandya |
| 2004/0010612 | A1 | | 1/2004 | Pandya |
| 2004/0030757 | A1 | | 2/2004 | Pandya |
| 2004/0030770 | A1 | | 2/2004 | Pandya |
| 2004/0030806 | A1 | | 2/2004 | Pandya |
| 2004/0034718 | A1 | * | 2/2004 | Goldenberg et al. ........ 709/250 |
| 2004/0037299 | A1 | | 2/2004 | Pandya |
| 2004/0037319 | A1 | | 2/2004 | Pandya |
| 2004/0042483 | A1 | * | 3/2004 | Elzur et al. .................. 370/463 |
| 2004/0165588 | A1 | | 8/2004 | Pandya |
| 2004/0210320 | A1 | | 10/2004 | Pandya |
| 2005/0108518 | A1 | | 5/2005 | Pandya |
| 2006/0136570 | A1 | | 6/2006 | Pandya |
| 2008/0253395 | A1 | | 10/2008 | Pandya |
| 2009/0019538 | A1 | | 1/2009 | Pandya |

OTHER PUBLICATIONS

U.S. Appl. No. 10/663,026, filed Sep. 15, 2003, Ashish Choubal, et al.
U.S. Appl. No. 10/683,941, filed Oct. 9, 2003, Christopher Foulds, et al.
U.S. Appl. No. 10/746,162, filed Dec. 24, 2003, Christopher Foulds.
IA-32 Intel® Architecture Optimization Reference Manual, Intel Corporation 2003, Chapters 1 and 6 (pp. i-xxviii; 1-1 to 1-34; and 6-1 to 6-48).
Wikipedia, "Scratchpad RAM", available at http://en.wikipedia.org/wiki/Scratchpad_RAM, retrieved on Feb. 12, 2009.

* cited by examiner

*Primary Examiner*—Kevin C Harper
*Assistant Examiner*—Wanda Z Russell
(74) *Attorney, Agent, or Firm*—Grossman, Tucker, Perreault & Pfleger, PLLC

(57) ABSTRACT

A system and method for processing a packet such as an inbound RDMA write packet in a network communication system. When processing the packet, a prefetch may retrieve a header of the next packet or, in the case of the inbound RDMA write packet, the prefetch may additionally retrieve an inbound RDMA send context. Subsequent to the prefetch beginning, processing of the packet may be completed and much of the overhead for processing of the next packet may have already completed. Other embodiments are also described.

17 Claims, 3 Drawing Sheets

SOFTWARE ASSISTED RDMA

BACKGROUND

Specific matter disclosed herein relates to the field of remote direct memory access (RDMA). RDMA technology or environments, among other things, may reduce system overhead when connecting IP storage to networks and servers on network connections. Several network overhead reduction methods exist including RDMA products, e.g., RDMA programs and processes may decrease network latency and may increase throughput. RDMA may also reduce data copy operations found in communication programs such as Transmission Control Protocol/Internet Protocol (TCP/IP). TCP/IP is understood to be one of the basic communication languages or protocols of the Internet. This demand reduction leads to the RDMA protocol being used to reduce demands on both Central Processing Units (CPUs) and memory resources because each incoming network packet has enough information to allow it to be placed directly into final destination memory. These advantages of RDMA are particularly useful as 10 Gigabit Ethernet products are developed.

A CPU may be capable of executing an instruction for the "prefetch" of data while the CPU is currently executing a previous instruction. The CPU may execute such a prefetch instruction by loading a data item to a portion of on-die cache concurrently with the execution of a previous instruction. Such an instruction may be executed by microprocessors sold by Intel Corporation such as the Pentium 4® processor. Such a prefetch instruction may allow the processor to continue operating while the prefetched load is pending on a system bus.

BRIEF DESCRIPTION OF DRAWINGS

The invention may best be understood by referring to the following description and accompanying drawings that are used to illustrate embodiments of the invention. In the drawings.

DETAILED DESCRIPTION

Figure 1:
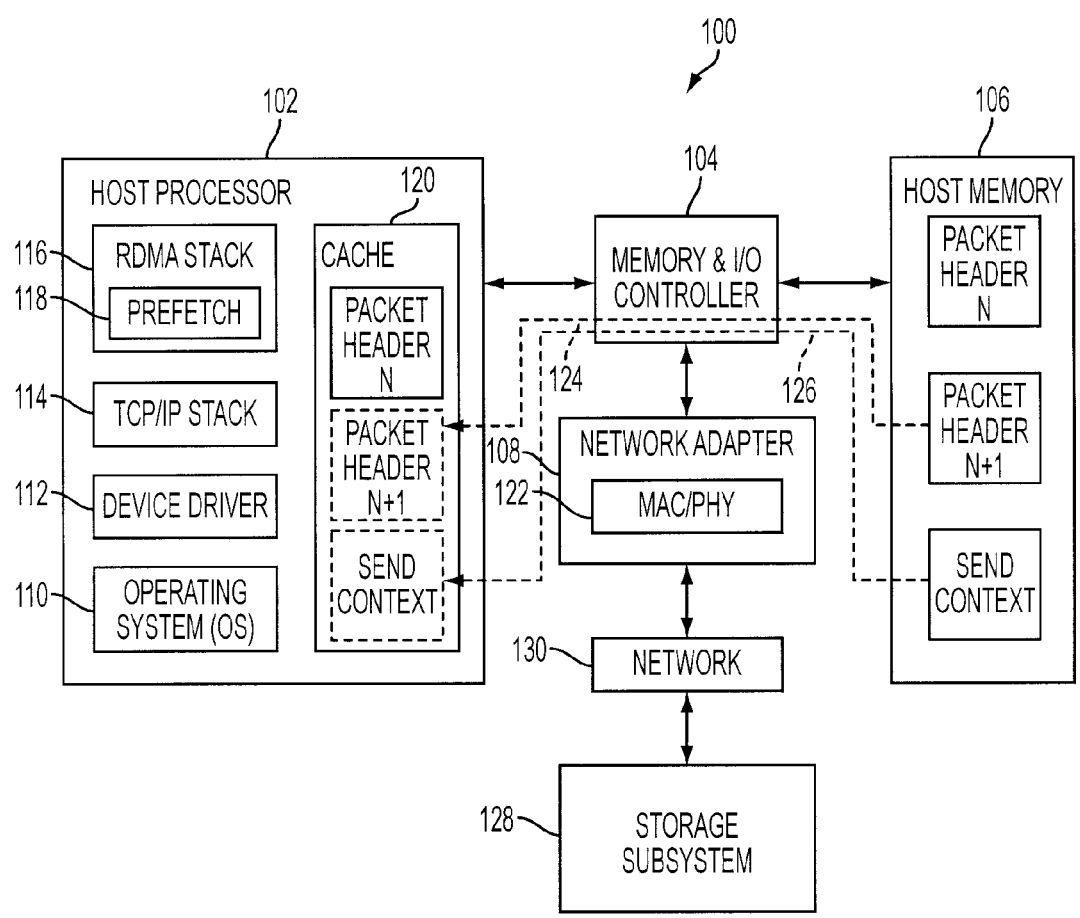
FIG. 1 illustrates a system to perform RDMA communication according to an embodiment.

The phrase "processing system" as discussed herein relates to a combination of hardware and software resources for accomplishing computational tasks. However, this is merely an example of a processing system and embodiments of the present invention are not limited in this respect.

The phrase "host processing system" relates to a processing system which may be adapted to communicate with a "peripheral device." For example, a peripheral device may provide inputs to or receive outputs from an application process hosted on the host processing system. However, these are merely examples of a host processing system and a peripheral device, and embodiments of the present invention are not limited in these respects.

The phrase "network communication system" as referred to herein may be considered to be a processing system on a network such as the internet or a local area network. However, this is merely an example of a network communication system and embodiments of the present invention are not limited in these respects.

The phrase "network software program" is a program or software program that contributes to network traffic on a network communication system. The network software program typically utilizes a network element to access the network communication system.

The phrase "storage medium" as referred to herein relates to media capable of maintaining expressions which are perceivable by one or more machines. For example, a storage medium may comprise one or more storage devices for storing machine-readable instructions or data. Such storage devices may comprise storage media such as, for example, optical, flash, magnetic or semiconductor storage media. However, these are merely examples of a storage medium and embodiments of the present invention are not limited in these respects.

The phrase "an inbound RDMA write packet" as referred to herein may be considered to be a particular frame received over a network, possibly alone or as one of a sequence of frames, comprising a write type operation as specified by the RDMA protocol. However, this is merely an example of an inbound RDMA write packet and embodiments of the present invention are not limited in these respects.

The phrase "last flag" as referred to herein may be considered to be information in the protocol header that when set represents the last segment of an RDMA message. However, this is merely an example of a last flag and embodiments of the present invention are not limited in these respects.

The term "prefetch" as referred to herein may be considered to be a prefetch operation/instruction which is executable by a processor. The availability of such a prefetch instruction may enable a software designer to develop code that explicitly loads a cache at an earlier point in time than the processor could have in the absence of such a prefetch instruction. However, this is merely an example of a prefetch and embodiments of the present invention are not limited in these respects.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 illustrates a system 100 to perform RDMA communication according to an embodiment. The system 100 may include a host processor 102 that may communicate with a memory and input/output (I/O) controller 104 for access to a host memory 106 and a network adapter 108 via, e.g., a PCI-Express bus, a PCI-X bus, some other type of a bus, or possibly integrated with a core logic chipset with the memory and I/O controller 104. The host processor 102 may include storage media to store machine-readable instructions for operation of an operating system 110 that supports a device driver 112 and a TCP/IP stack 114. Also in the host processor 102 may be an RDMA stack 116 to support RDMA communications with the host memory 106.

The RDMA stack 116 may assist in the processing of RDMA packets that enter the system 100. While the RDMA stack 116 is processing an RDMA packet, a prefetch operation 118 in the RDMA stack 116 may execute to begin processing of a header of a subsequent or next RDMA packet received in the system 100 while the processing of the first RDMA packet is momentarily interrupted. Thus, when RDMA packets are received, the processing of an RDMA packet may overlap with initiating processing for the next RDMA packet. In other words, cache 120 operations may overlap RDMA packet processing to boost the overall performance of packet processing in the system 100 by reducing the time that the host processor 102 must wait for overhead operations of the next packet to complete. In addition, because the overhead processing and the packet processing may overlap, the need is reduced for offloading software/hardware from the host processor 102 to improve system 100 performance. As represented by medium access control/physical layer (MAC/PHY) 122, the network adapter 108 may send and receive packets according to any one of several different data link protocols such as IEEE Std. 802.3, IEEE Std. 802.11, IEEE Std. 802.16, etc. over any one of several data transmission media such as, for example, a wireless air interface or cabling (e.g., coaxial, unshielded twisted pair or fiber optic cabling). In the illustrated embodiment, the network adapter 108 may transmit packets to or receive packets from a storage subsystem 128. The storage subsystem 128 may include a storage controller and magnetic storage media (not shown) capable of providing a redundant array of independent disks (RAID). A network 130 may comprise a router (not shown) for directing the transmission of packets between the network adapter 108 and the storage subsystem 128 according to a network protocol (e.g., TCP/IP).

The host processor 102 may comprise any one of several commercially available microprocessors capable of executing a prefetch instruction such as the Pentium 4® microprocessor sold by Intel Corporation. In one embodiment, while processing an RDMA packet, the host processor 102 may load the cache 120 with the context information for a subsequent RDMA.

Dashed lines 124 and 126 of the system 100 illustrate placement of information into the cache 120 without accessing the network adapter 108 to retrieve the information from the memory 106. Dashed line 124 may represent information such as packet header N+1 being moved from host memory 106 to an "in-flight" queue of the memory and I/O controller 104 and then into the cache 120. Likewise, dashed line 126 may represent send context information being moved from host memory 106 to the cache 120 via the in-flight queue of the memory and I/O controller 104. Movement of information to the cache 120 without the overhead of retrieving the information from the memory 106 via the network adapter 108 may serve to expedite network software processing in the system 100.

Figure 2:
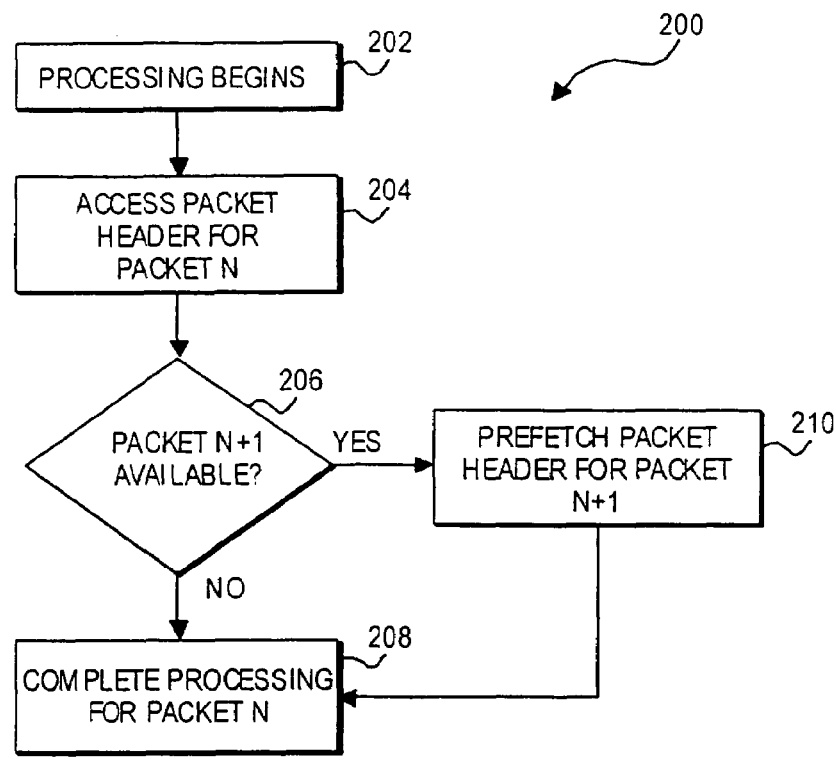
FIG. 2 illustrates a process to prefetch a packet header while processing an earlier packet according to an embodiment.
Figure 4:
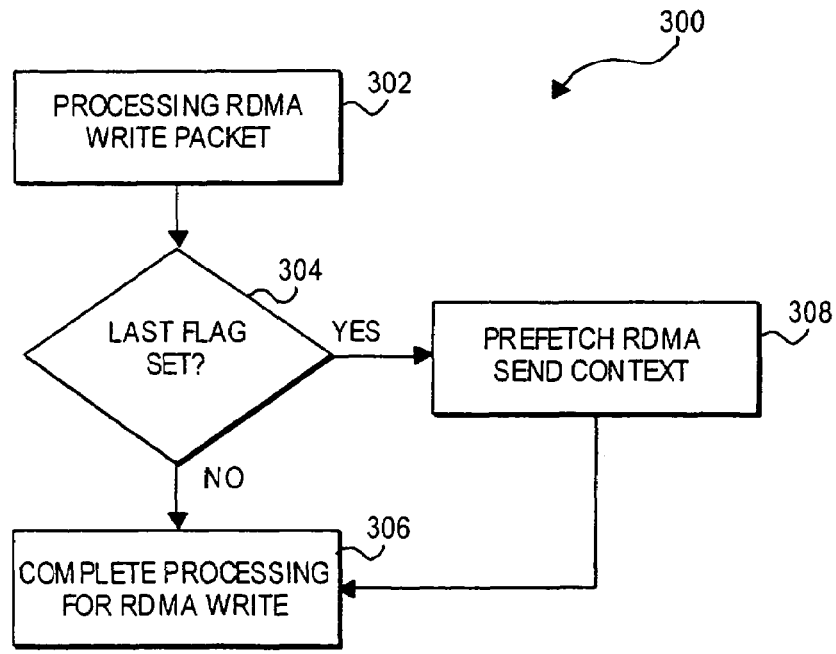
FIG. 4 illustrates a process to prefetch RDMA send information while processing an RDMA write operation.

FIGS. 2 and 4 illustrate processes that may be executed by the host processor 102 under the control of machine-readable instructions stored on a storage medium (e.g. the host memory 106). FIG. 2 illustrates a process 200 for the system 100 to prefetch a packet header while processing a different packet according to an embodiment. At block 202 processing for a packet such as an RDMA packet received at the network adapter 108 may begin. As many packets may be processed, an initial packet is represented as packet N and the next packet is represented as packet N+1. At block 204, the header for packet N may be accessed and processing of packet N may begin at the host processor 102. While processing packet N, at diamond 206, the host processor 102 may determine whether packet N+1 is available for processing by the system 100. If packet N+1 is not available for processing because it has not arrived at the system 100, processing for packet N is completed at block 208 without a prefetch for the header of packet N+1. If at diamond 206 the host processor 102 determines that packet N+1 is available for processing, then at block 210 the host processor 102 may perform a prefetch for the packet header of packet N+1. While the prefetch is in progress, packet N may continue being processed and the processing for packet N may be completed at block 208. While diamond 206 and block 210 specify prefetch of a packet header for packet N+1 in the presently illustrated embodiment (i.e., while header packet N is being processed), it should be understood that in other embodiments the host processor 102 may prefetch the packet header of any future packet (e.g., the header from N+2, N+3, etc.).

According to an embodiment, block 210 may represent the execution of a prefetch instruction that that loads entire cache line to the cache 120 from the host memory 106. The network adapter 108 may store received data packets in predefined buffer locations of the host memory 106 in any one of several queued data structures such as a ring buffer, linked list, etc. Accordingly, processing at diamond 206 may determine whether any unprocessed packet headers are in such a data structure. Block 210 may then execute a prefetch instruction to load a remaining unprocessed packet header from its location in host memory 106 to a cache line in cache 120.

As may be appreciated from the process 200, when the prefetch of the header for packet N+1 is appropriately timed with the processing of packet N, the prefetch allows the efficiency of the system 100 to improve. Among other reasons, the efficiency may improve in the disclosed embodiment because the host processor 102 may not waste cycles waiting for the header of packet N+1 to load at the cache 120 after processing of packet N has completed and when packet N+1 is ready to be processed.

Figure 3:
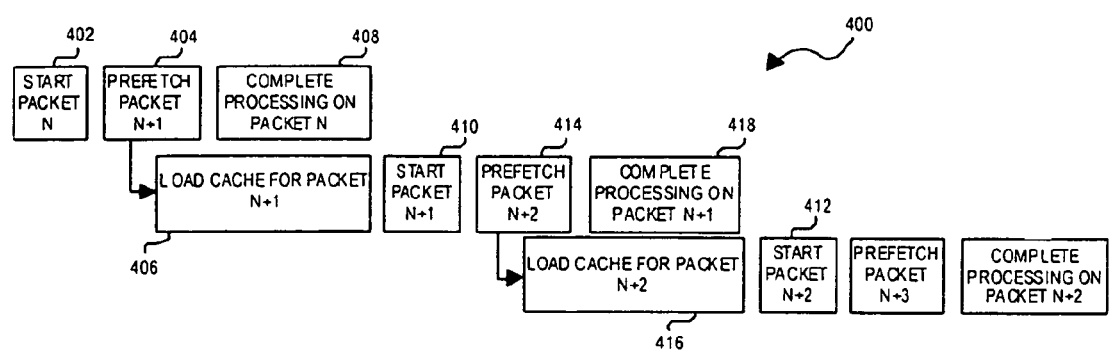
FIG. 3 illustrates packet processing flow when packet headers are prefetched during operation.

FIG. 3 illustrates packet processing flow 400 for processing context information of RDMA packets. Block 402 represents the beginning of packet processing for packet N. As processing for packet N begins, at block 404 a prefetch for packet N+1 begins. At block 406, the cache 120 may be loaded with the header for packet N+1 in parallel with the processing of packet N that may be completed at block 408. The cycle may be repeated at block 410 and at block 412 where processing begins for packet N+1 and packet N+2, respectively. Subsequent to block 410, a prefetch for packet N+2 begins at block 414 and the header for packet N+2 is loaded into the cache 120 at block 416. Packet N+1 may complete processing at block 418 such that blocks 416 and 418 may operate essentially in parallel. The flow 400 may repeat as long as a new packet (e.g., packet N+2 at block 412) is available to begin processing after packet N+1 completes processing. The parallel nature of the processing flow 400 may demonstrate an improved system 100 efficiency by the prefetching of the headers for packet N+1, for packet N+2, etc.

FIG. 4 illustrates a process 300 to prefetch RDMA send information while processing an RDMA write operation. The RDMA protocol implies that upon completion of processing for an RDMA write operation, an RDMA send operation may occur. When the processing for an RDMA write operation logically completes a "Last flag" is set to indicate that the RDMA send should be sent. At block 302, processing may begin on an RDMA write. At diamond 304, the host processor 102 may determine whether the Last flag is set in the RDMA write to signify that the RDMA write operation has logically completed. If the Last flag is not set, processing for the RDMA write operation is completed at block 306. On the other hand, if the host processor 102 determines that the Last flag is set, at block 308 a prefetch operation begins for the RDMA send context. While the prefetch is in progress at block 308, processing for the RDMA write operation completes at block 306. The prefetch places data structures associated with the RDMA send in the cache 120 to avoid a cache 120 miss upon actual reception of the RDMA send operation.

While the invention has been described in terms of several embodiments, those of ordinary skill in the art should recognize that the invention is not limited to the embodiments described, but can be practiced with modification and alteration within the spirit and scope of the appended claims. The description is thus to be regarded as illustrative instead of limiting.

What is claimed is:

1. A method of RDMA processing in a host processor having an on-die cache and capable of executing a prefetch instruction, the method comprising:
   processing, by the host processor, at least a portion of an inbound RDMA write packet received from a communication system;
   prefetching into the cache, by the host processor and prior to completing the processing of the portion of the inbound RDMA write packet, at least a portion of an inbound RDMA send context in response to determining that a flag is set in the inbound RDMA write packet; and
   completing, by the host processor, the processing of the portion of the inbound RDMA write packet while said prefetching of the inbound RDMA send context is in progress.

2. The method of claim 1 wherein said processing, said prefetching, and said completing the processing is repeated for at least a portion a second inbound RDMA write packet.

3. The method of claim 1 wherein the flag in the inbound RDMA write packet comprises a Last flag.

4. The method of claim 3 wherein said Last flag comprises a bit that is set in a header of the inbound RDMA write packet in response to completion of an RDMA write operation.

5. The method of claim 1 wherein said prefetching the inbound RDMA send context comprises inhibiting a cache miss stall upon reception of an actual RDMA send operation.

6. The method of claim 5 wherein said prefetching begins prior to completion of the processing of an RDMA write header.

7. An article comprising:
   a machine-readable storage medium having stored thereon instructions that when executed by a machine result in a method of RDMA processing in a host processor having an on-die cache and capable of executing a prefetch instruction, the method comprising:
   processing, by the host processor, at least a portion of a header of a first RDMA packet received from a network communication system;
   prefetching into the cache, by the host processor and prior to completing the processing of the first RDMA packet, at least a portion of a header of a second RDMA packet in response to determining that a flag is set in the first RDMA packet; and
   completing, by the host processor, the processing of the portion of the first RDMA packet while said prefetching of the second RDMA packet header is in progress.

8. The article of claim 7, wherein the machine-readable instructions are executable to complete processing of the portion of the header of the second packet upon completion of the processing of the portion of the header of the first packet.

9. The article of claim 7, wherein the machine-readable instructions comprise a network software program executable to complete processing of the portion of the header of the first packet and the portion of the header of the second packet.

10. The article of claim 7, wherein the network communication system comprises a host processing system.

11. A system comprising:
    a network adapter to receive RDMA data packets from a communication network according to an Ethernet protocol;
    a host memory to store the received RDMA data packets; and
    a host processor to process the stored RDMA data packets, wherein the host memory further comprises machine-readable instructions executable on the host processor to carry out a method of RDMA processing in the host processor, the host processor having an on-die cache and capable of executing a prefetch instruction, the method comprising:
    processing at least a portion of an inbound RDMA write packet received from a communication system;
    prefetching into the cache, prior to completing the processing of the portion of the inbound RDMA write packet, at least a portion of an inbound RDMA send context in response to determining that a flag is set in the inbound RDMA write packet; and
    completing the processing of the portion of the inbound RDMA write packet while said prefetching of the inbound RDMA send context is in progress.

12. The system of claim 11 wherein the host memory further comprises machine-readable instructions executable to
    complete processing of the portion of a second packet; and
    prefetch at least a portion of a header of another received data packet in response to determining that the another packet is available for processing by the host processor.

13. The system of claim 11 wherein the communication network comprises an unshielded twisted pair cable to transmit packets in the communication network.

14. A system comprising:
    a storage subsystem;
    a processing platform;
    a communication network to transmit packets between the storage subsystem and the processing platform according to a network protocol,
    wherein the processing platform further comprises:
    a network adapter to receive data packets from the communication network;
    a host memory to store the received data packets; and
    a host processor to process the stored data packets, wherein the host memory further comprises machine-readable instructions executable on the host processor to carry out a method of RDMA processing in the host processor, the host processor having an on-die cache and capable of executing a prefetch instruction, the method comprising:
    processing at least a portion of an inbound RDMA write packet received from a communication system;
    prefetching into the cache, prior to completing the processing of the portion of the inbound RDMA write packet, at least a portion of an inbound RDMA send context in response to determining that a flag is set in the inbound RDMA write packet; and
    completing the processing of the at least a portion of the inbound RDMA write packet while said prefetching of the inbound RDMA send context is in progress.

15. The system of claim 14, wherein the storage subsystem comprises a redundant array of independent disks.

16. The system of claim 14, wherein the communication network further comprises a router to route packets between the processing platform and the storage subsystem according to a network protocol.

17. The system of claim 14, wherein the network adapter is capable of receiving the data packets from the communication network according to an Ethernet protocol.

* * * * *